US008799266B2

(12) United States Patent
Barsness et al.

(10) Patent No.: US 8,799,266 B2
(45) Date of Patent: Aug. 5, 2014

(54) METHOD AND SYSTEM FOR MANAGING OPERATION OF A USER-DEFINED FUNCTION ON A PARTITIONED DATABASE

(75) Inventors: Eric L. Barsness, Pine Island, MN (US);
John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1234 days.

(21) Appl. No.: 11/468,926

(22) Filed: Aug. 31, 2006

(65) Prior Publication Data

US 2008/0059440 A1   Mar. 6, 2008

(51) Int. Cl.
*G06F 17/30* (2006.01)
*G06F 15/16* (2006.01)
(52) U.S. Cl.
USPC .......................................................... 707/713
(58) Field of Classification Search
USPC ................................................................ 707/4
See application file for complete search history.

(56) References Cited

U.S. PATENT DOCUMENTS

| 5,734,885 | A | * | 3/1998 | Agrawal et al. ................... 707/3 |
| 6,085,223 | A | * | 7/2000 | Carino et al. ................. 709/203 |
| 6,192,358 | B1 | * | 2/2001 | Fuh et al. ........................... 707/4 |
| 6,289,334 | B1 | | 9/2001 | Reiner et al. |
| 6,594,651 | B2 | * | 7/2003 | Kabra et al. ....................... 707/2 |
| 2002/0032676 | A1 | * | 3/2002 | Reiner et al. ...................... 707/3 |
| 2005/0080766 | A1 | * | 4/2005 | Ghatare ............................. 707/3 |
| 2005/0097099 | A1 | * | 5/2005 | Kapoor et al. .................... 707/3 |
| 2005/0108211 | A1 | * | 5/2005 | Karimisetty et al. ............. 707/3 |

* cited by examiner

*Primary Examiner* — Brittany N Allen
(74) *Attorney, Agent, or Firm* — Patterson & Sheridan LLP

(57) ABSTRACT

The present invention generally relates to data processing and, more particularly, to managing operation of user-defined functions on a partitioned database. One embodiment provides a computer-implemented method for managing execution of a query against a partitioned database having a plurality of data partitions. The method comprises, for each of the plurality of data partitions, examining data of the data partition, and on the basis of examined data, implementing a modified form of a user-defined function on the data partition. The method further comprises executing the query referring to the user-defined function against the plurality of data partitions, wherein execution of the query on each data partition invokes execution of the respective modified form of the user-defined function against the data of the respective data partition.

15 Claims, 4 Drawing Sheets

METHOD AND SYSTEM FOR MANAGING OPERATION OF A USER-DEFINED FUNCTION ON A PARTITIONED DATABASE

BACKGROUND OF THE INVENTION

1. Field of the Invention

The present invention generally relates to data processing and, more particularly, to managing operation of user-defined functions on a partitioned database.

2. Description of the Related Art

Databases are computerized information storage and retrieval systems. A relational database management system (RDBMS) is a database management system (DBMS) that uses techniques for storing and retrieving data. The most prevalent type of database is the relational database, a tabular database in which data is defined so that it can be reorganized and accessed in a number of different ways.

Databases are typically partitioned to improve availability, performance, and scalability. Partitioning a database involves dividing the database or its constituent elements into distinct individual parts. For example, a database may be partitioned by building smaller separate databases, each with its own tables, indexes, transaction logs, etc. or by splitting a selected element, for example a field of a table. The database may be partitioned within a single server, or distributed or replicated across multiple servers. Therefore, database partitioning provides multiple benefits including scalability to support large databases, the ability to handle complex workloads, and increased parallelism.

When queries are run against a partitioned database, the query may be run against each partition. The results from each partition may then be integrated to provide a complete query result for the query. To further improve performance of querying a database, the query may not be run against one or more partitions which are known to not contain results for the query. For example, an underlying database may be partitioned based on location. The locations, for example, may be divided into 4 partitions, each partition being associated with data from one of the eastern states, western states, northern states, and southern states.

If a query containing a condition STATE='MAINE' is run against the underlying database, the query need not be run against partitions containing data for southern and western states. Therefore, by eliminating the number of partitions against which a query is executed, the performance may be improved. However, even with elimination of partitions, the query may still be run against multiple partitions. For example, the above query may be executed against the northern states partition and the eastern states partition.

Furthermore, queries that are executed against a partitioned database can be associated with user-defined functions that are configured to perform predefined operations on data returned from the partitioned database in response to execution of the queries. For instance, if a given query requests data related to prices of selected products, an associated user-defined function (UDF) can be configured to change retrieved prices if a predefined condition is satisfied. By way of example, the UDF could be configured for computing discounted prices for senior citizens living in the state 'MAINE'.

One problem with running a query having an associated UDF against multiple partitions is that a given UDF may not be necessary suitable for execution on each data partition. For example, assume that in the given example the above query is associated with the above UDF and run against the partitions containing data for the northern and eastern states. Assume further that the eastern states partition does not include data records related to senior citizens and that determination of a result set from the eastern states partition takes significantly longer than determination of a result set from the northern states partition. Accordingly, execution of the query against the eastern partition may be unnecessarily slowed down lead to a meaningless result set as the UDF is executed against data that does not need to be modified not executed on a corresponding result set returned from the eastern partition. Thus, execution of the query against the underlying database is inefficient because the complete result set for the above query is not returned to the user until the results from the slower partition, i.e., the eastern states partition, are available. Furthermore, a significant amount of time may be wasted while waiting for the slower partition to complete. Therefore overall query throughput may be adversely affected.

Therefore, there is a need for an efficient technique for managing operation of user-defined functions on partitioned databases.

SUMMARY OF THE INVENTION

The present invention generally relates to data processing and, more particularly, to managing operation of user-defined functions on a partitioned database.

One embodiment provides a computer-implemented method for managing execution of a query against a partitioned database having a plurality of data partitions. The method comprises, for each of the plurality of data partitions, examining data of the data partition, and on the basis of examined data, implementing a modified form of a user-defined function on the data partition. The method further comprises executing the query referring to the user-defined function against the plurality of data partitions, wherein execution of the query on each data partition invokes execution of the respective modified form of the user-defined function against the data of the respective data partition.

Another embodiment provides a computer-implemented method for managing execution of a query against a partitioned database having a plurality of data partitions. The method comprises receiving a query for execution against each of the plurality of data partitions, the query referencing a user-defined function. At least some of the plurality of data partitions are associated with modified forms of the user-defined function. The method further comprises executing the query against each of the plurality of data partitions, wherein executing the query on a given data partition comprises invoking the respective associated user-defined function. Then, results are returned from each of the plurality of data partitions.

Still another embodiment provides a computer-readable medium containing a program which, when executed by a processor, performs an operation for managing execution of a query against a partitioned database having a plurality of data partitions. The operation comprises receiving the query for execution against each of the plurality of data partitions, the query referencing a user-defined function. At least some of the plurality of data partitions are associated with modified forms of the user-defined function, each modified form of the user-defined function being configured to avoid running unnecessary code fragments returning meaningless data for the query executed against the respective data partition. The operation further comprises executing the query against each of the plurality of data partitions, wherein executing the query on a given data partition comprises invoking the respective associated user-defined function. Then, results are returned from each of the plurality of data partitions.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Introduction

Figure 1:
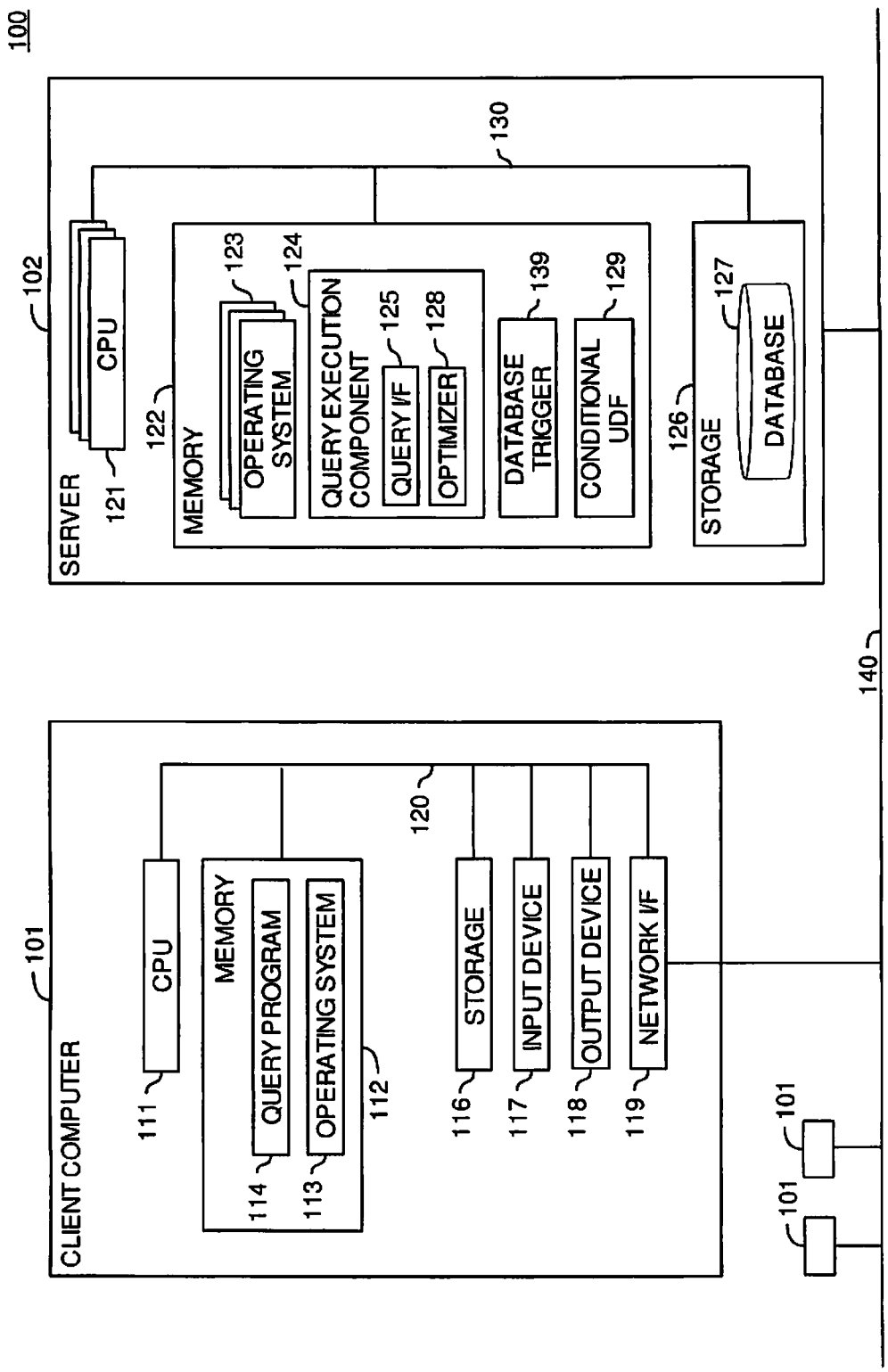
FIG. 1 is an illustration of an exemplary computer system according to one embodiment of the invention.

The present invention generally relates to data processing and, more particularly, to managing operation of user-defined functions on a partitioned database. In general, a user-defined function is a mechanism which allows users to create user or application-specific operations for data processing. According to one aspect, a user-defined function executed with respect to a partitioned database can be referenced by a query. Thus, the user or application-specific operations defined by the user-defined function can be performed on data returned in a query result for the issued query.

In one embodiment, a partitioned database having a plurality of data partitions is setup for operation of a given user-defined function. To this end, it is determined for each of the plurality of data partitions whether only a portion of the given user-defined function is applicable with respect to data contained in a corresponding data partition. If so, the given user-defined function is modified for the corresponding data partition(s) such that the modified user-defined function only includes the applicable portion of the given user-defined function. The modified user-defined function is then stored in the corresponding data partition(s). Otherwise, the complete given user-defined function is stored in the corresponding data partition(s) (or otherwise associated with the corresponding data partition(s)).

In one embodiment, a query is executed that references the given user-defined function. The given user-defined function needs to be executed against the plurality of data partitions to determine a corresponding result set with respect to each data partition. The determined result sets from the plurality of data partitions may be integrated to provide a query result for the query. However, instead of executing the complete user-defined function against data records of each of the plurality of data partitions, only the modified user-defined function is executed against data records of the corresponding data partition(s) having the modified user-defined function. Thus, query processing can be improved as only applicable portions of the given user-defined function are executed on data records stored in each of the plurality of data partitions.

Preferred Embodiments

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system such as, for example, the network environment 100 shown in FIG. 1 and described below. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) having information permanently stored thereon; and (ii) writable storage media (e.g., floppy disks within a diskette drive or hard-disk drive) having alterable information stored thereon. In other embodiments, information may be conveyed to a computer by a communications medium, such as through a computer or telephone network, including wireless communications. The latter embodiment specifically includes information downloaded from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

An Exemplary Computer System

FIG. 1 depicts a block diagram of a networked system 100 in which embodiments of the present invention may be implemented. In general, the networked system 100 includes a client (e.g., user's) computer 101 (three such client computers 101 are shown) and at least one server 102 (one such server 102 shown). The client computers 101 and server 102 are connected via a network 140. In general, the network 140 may be a local area network (LAN) and/or a wide area network (WAN). In a particular embodiment, the network 140 is the Internet.

The client computer 101 includes a Central Processing Unit (CPU) 111 connected via a bus 120 to a memory 112, storage 116, an input device 117, an output device 118, and a network interface device 119. The input device 117 can be any device configured to give input to the client computer 101. For example, a keyboard, keypad, light-pen, touch-screen, track-ball, or speech recognition unit, audio/video player, and the like could be used. The output device 118 can be any device configured to give output to the user, e.g., any conventional display screen. Although shown separately from the input device 117, the output device 118 and the input device 117 could be combined. For example, a display screen with an integrated touch-screen, a display with an integrated keyboard, or a speech recognition unit combined with a text speech converter could be used.

The network interface device 119 may be any entry/exit device configured to allow network communications between the client computers 101 and server 102 via the network 140. For example, the network interface device 119 may be a network adapter or other network interface card (NIC).

Storage 116 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 116 could be part of one virtual address space spanning multiple primary and secondary storage devices.

The memory 112 is preferably a random access memory sufficiently large to hold the necessary programming and data structures of the invention. While memory 112 is shown as a single entity, it should be understood that memory 112 may in fact comprise a plurality of modules, and that memory 112 may exist at multiple levels, from high speed registers and caches to lower speed but larger DRAM chips.

Illustratively, the memory 112 contains an operating system 113. Illustrative operating systems, which may be used to advantage, include Linux (Linux is a trademark of Linus Torvalds in the US, other countries, or both) and Microsoft's Windows®. More generally, any operating system supporting the functions disclosed herein may be used.

Memory 112 is also shown containing a query program 114 which, when executed by CPU 111, provides support for querying a server 102. In one embodiment, the query program 114 includes a web-based Graphical User Interface (GUI), which allows the user to display Hyper Text Markup Language (HTML) information. More generally, however, the query program 114 may be a GUI-based program capable of rendering the information transferred between the client computer 101 and the server 102.

The server 102 may by physically arranged in a manner similar to the client computer 101. Accordingly, the server 102 is shown generally comprising one or more CPUs 121, a memory 122, and a storage device 126, coupled to one another by a bus 130. Memory 122 may be a random access memory sufficiently large to hold the necessary programming and data structures that are located on the server 102.

In one embodiment of the invention, server 102 may be a logically partitioned system, wherein each partition of the system is assigned one or more resources available in server 102. Accordingly, server 102 may generally be under the control of one or more operating systems 123 shown residing in memory 122. Each logical partition of server 102 may be under the control of one of the operating systems 123. Examples of the operating system 123 include IBM OS/400®, UNIX, Microsoft Windows®, and the like. More generally, any operating system capable of supporting the functions described herein may be used.

While a logically partitioned system is described herein, one skilled in the art will recognize that embodiments of the invention are not limited to such logically partitioned systems. Embodiments of the invention may also be implemented in physically partitioned systems, non-partitioned systems, or any other reasonable system configuration.

The memory 122 may include a query execution component 124. The query execution component 124 may be a software product comprising a plurality of instructions that can be resident at various times in various memory and storage devices in the computer system 100. For example, the query execution component 124 may contain a query interface 125. The query interface 125 (and more generally, any requesting entity, including the operating system 123) is configured to issue queries against a database 127 (shown in storage 126).

Query execution component 124 may also include an optimizer 128. Optimizer 128 may determine the most efficient way to execute a query. For example, optimizer 128 may consider a plurality of access plans for a given query and determine which of those plans will be the most efficient. Determining efficiency of an access plan may include determining an estimated cost for executing the query. The cost may be determined, for example, by available memory, number of Input/Output (IO) operations required to execute the query, CPU requirements, and the like.

Database 127 is representative of any collection of data regardless of the particular physical representation. By way of illustration, the database 127 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

In one embodiment of the invention, the database 127 is a partitioned database. Accordingly, database 127 may be divided or broken into its constituent elements to create distinct individual parts referred to as "data partitions". A data partition consists of its own data, indexes, configuration files, and transaction logs. A data partition is sometimes called a node or a database node. For example, database 127 may be partitioned by building smaller separate databases, each with its own tables, indexes, transaction logs, etc., or by splitting a selected element, for example a field of a table. Tables can be located in one or more data partitions. When a table's data is distributed across multiple partitions, some of its rows are stored in one partition, and other rows are stored in other partitions. It should be noted that, in practice, partitioned databases used for commercial, scientific, medical, financial, etc. purposes would typically have hundreds or thousands (or more) of columns and in excess of millions of rows.

In one embodiment, the partitioned database 127 contains one or more data partitions of a larger database. Thus, in one embodiment, the individual partitions may be distributed over a plurality of servers (such as server 102). A query received from a client 102 may be executed against one or more of the data partitions of the larger database contained in the one or more servers 102. Data retrieval and update requests are decomposed automatically into sub-requests, and executed in parallel among the applicable data partitions. The fact that databases are split across data partitions may be transparent to users.

Typically, a single data partition exists on each physical component that makes up a computer. The processors on each system are used by the database manager at each data partition to manage its part of the total data in the database. Because data is divided across data partitions, the power of multiple processors on multiple computers may be used to satisfy requests for information. Data retrieval and update requests are decomposed automatically into sub-requests and are executed in parallel among the applicable data partitions.

User interaction occurs through one data partition, known as the coordinator partition for that user. The coordinator runs on the same data partition as the application, or, in the case of a remote application, the data partition to which that application is connected. Any data partition can be used as a coordinator partition.

Memory 122 illustratively also includes one or more user-defined functions (UDFs) 129 (only a single UDF is illustrated, for simplicity). In general, a UDF is code which allows users to create user or application-specific operations for data processing. By way of example, UDFs can be created to perform calculations, both simple and complex. However, the complexity of UDFs may greatly differ from case to case. For instance, in some simple cases UDFs can be provided to convert to uppercase and trim a character field. In more complex cases, UDFs can be provided to convert to uppercase and trim a field based on the field's value and subsequently concatenate the field with something else. In still more complex examples, UDFs may convert values using complex mathematical expressions.

In one embodiment, the UDF 129 includes one or more conditional statements and is, therefore, hereinafter also referred to as the "conditional" UDF 129. The one or more conditional statements are configured for selecting data records from the partitioned database 127 for which associated instructions are to be executed. In other words, each conditional statement is associated with one or more instructions defining a selected user or application-specific operation that can be executed on retrieved data. Accordingly, the UDF 129 is configured for execution of corresponding instructions with respect to data records returned from data partitions of the partitioned database 127 that satisfy corresponding conditional statement(s).

In one embodiment, a suitable setup process can be performed on the partitioned database 127 with respect to the UDF 129. More specifically, for each data partition of the partitioned database 127 it can be determined on the basis of the conditional statement(s) included with the UDF 129 whether the complete UDF 129 or only a portion of the instructions included therein are applicable with respect to the partition. An exemplary method of managing setup of a partitioned database having a plurality of data partitions for use with one or more UDFs is described below with reference to FIG. 3.

In one embodiment, the conditional UDF 129 can be referenced by a query, such as an SQL query issued by the query program 114 against the partitioned database 127. An exemplary method of managing execution of a query referencing a UDF against a partitioned database is described in more detail below with reference to FIG. 4.

Memory 122 illustratively further includes one or more database triggers 139 (only a single database trigger is illustrated, for simplicity). The database trigger(s) 139 can be configured to monitor modifications to the database 127 that may require a verification of the UDF setup of the data partitions of the partitioned database 127.

An Exemplary Partitioned Database Environment

Figure 2:
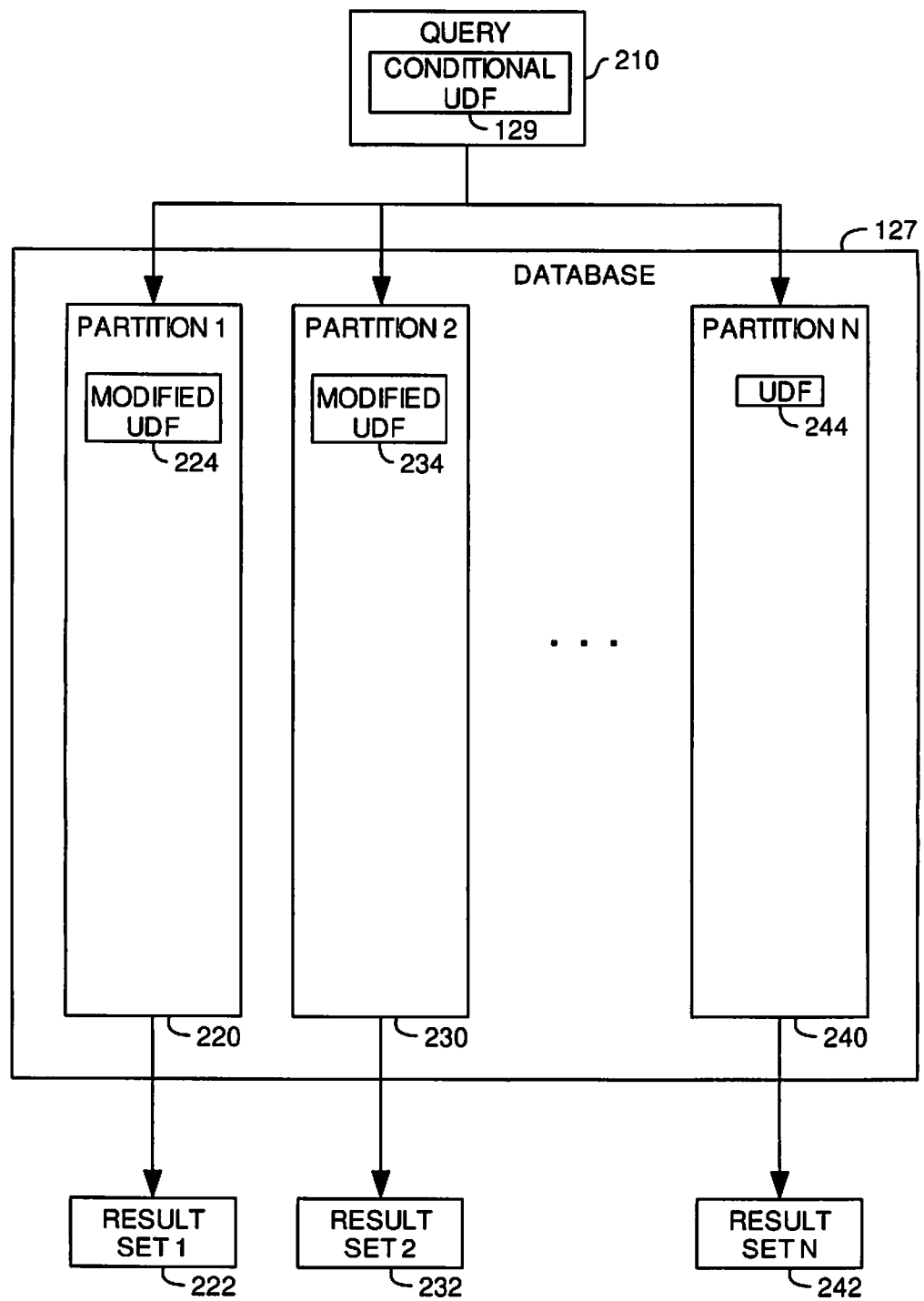
FIG. 2 is an illustration of a partitioned database, according to one embodiment of the invention.

FIG. 2 illustrates an exemplary implementation of the database 127 of FIG. 1 as a partitioned database according to one embodiment of the invention. Accordingly, the database 127 illustratively includes a plurality of data partitions 220 "PARTITION 1", 230 "PARTITION 2" and 240 "PARTITION N" (three partitions are illustrated, for simplicity).

In one embodiment, a query 210 is executed against the partitioned database 127. Query 210 may include a set of commands or clauses for retrieving data stored in the partitioned database 127. Furthermore, the query 210 may come from a client computer (e.g., client computer 102 of FIG. 1), an operating system (e.g., operating system 113 of FIG. 1), or a remote system. Moreover, the query 210 may specify columns of tables included with the partitioned database 127 from which data is to be retrieved, join criteria for joining columns from multiple tables, and conditions that must be satisfied for a particular data record to be included with a query result returned for the query 210. In one embodiment, the query 210 may invoke one or more UDFs to perform user or application-specific operations on data records included with the partitioned database 127.

Executing the query 210 against the partitioned database 127 involves running the query 210 against one or more of the plurality of data partitions 220, 230, 240. Illustratively, the query 210 is executed against each of the data partitions 220, 230, 240. One skilled in the art will recognize that when query 210 is executed against each data partition, each of the partitions 220, 230, 240 may take a different amount of time to return a corresponding result set 222, 232, 242 for the query 210. Factors affecting the time taken to retrieve results for a result set of a given partition may include the size of the partition, availability of a CPU to execute the query, clock speed, and the like. Each of the corresponding result sets 222, 232, 242 can be empty or include one or more data records. The returned result sets 222, 232, 242 can be combined to provide a complete query result for the query 210.

Illustratively, the query 210 references the conditional UDF 129 of FIG. 1 which is to be executed with respect to data retrieved for the query 210. As was noted above, the conditional UDF 129 may include one or more conditional statements and associated instructions. More specifically, each conditional statement may include one or more comparison or textual conditions that are combined using suitable Boolean operators. Furthermore, each conditional statement is associated with at least one instruction defining a user or application-specific operation to be performed on data records satisfying the statement.

It should be noted that embodiments of the invention refer to executing the query 210 against each data partition 220, 230, 240 of the partitioned database 127 and executing a respective UDF, such as the conditional UDF 129, on data records retrieved from the data partitions 220, 230, 240. However, in one embodiment the query 210 can be executed against a first database which can be partitioned or not. Then, the conditional UDF 129 is executed on data records returned in a query result for the query 210 from the first database on the basis of data included with a second database. The second database to which the UDF refers is a partitioned database according to embodiments of the invention. For instance, the query 210 can be configured to retrieve for one or more customers prices for selected products from a first database. The UDF 129 can be configured to calculate discount prices from the retrieved prices for the one or more customers dependent on the age of the customer(s). Corresponding age information for the customer(s) can be included with the second database, which can be partitioned with respect to different age groups, as described in more detail below by way of example. All such different implementations are broadly contemplated.

An illustrative query exemplifying the query 210 is shown in Table I below. By way of illustration, the illustrative query is defined using SQL. However, any other language may be used to advantage and is, thus, broadly contemplated.

TABLE I

SQL QUERY EXAMPLE

| 001 | SELECT |
|---|---|
| 002 | price, ADJ_PRICE(cust_id, price) |
| 003 | FROM |
| 004 | item_list |
| 005 | WHERE |
| 006 | item_num=? |

The exemplary SQL query of Table I is configured to retrieve information related to prices ("price" in line 002) of products that are uniquely identified by a corresponding item number ("item_num=?" in line 006, where "?" is a parameter marker indicating a value to be filled in). This information should be retrieved for a given customer who is uniquely identified by a corresponding customer identifier ("cust_id" in line 002) from an "item_list" table (line 003-004 of Table I). The "item_list" table can be stored in the database 127 or in a separate database, as noted above. Furthermore, a UDF (e.g., UDF 129) "ADJ_PRICE" (line 002 of Table I) is referenced to verify whether a discount price is available for the given customer and, if so, to calculate the discount price.

An illustrative UDF "ADJ_PRICE" exemplifying the UDF 129 is shown in Table II below. By way of illustration, the illustrative UDF is defined using SQL. However, any other language may be used to advantage and is, thus, broadly contemplated.

TABLE II

ADJ PRICE UDF EXAMPLE

| 001 | CREATE FUNCTION ADJ_PRICE(cust_id INT, price DOUBLE) |
|---|---|
| 002 | RETURNS DOUBLE |
| 003 | LANGUAGE SQL |
| 004 | BEGIN |
| 005 | DECLARE cust_age INT; |
| 006 | SELECT age into cust_age FROM cust_list WHERE c_id = cust_id; |
| 007 | IF cust_age > 65 THEN |
| 008 | RETURN price * 0.85; |
| 009 | ELSE IF cust_age < 12 THEN |
| 010 | RETURN price * 0.50; |
| 011 | ELSE |
| 012 | RETURN price; |
| 013 | END IF; |
| 014 | END; |

The exemplary UDF of Table II accesses a "cust_list" table (line 006) that is illustratively partitioned over the partitioned database 127 and includes age information ("cust_age" in line 006) for customers. Furthermore, the exemplary ADJ_PRICE UDF of Table II is configured to calculate on the basis of identified ages discount prices for children (line 010) and senior citizens (line 008) with respect to normal prices ("price" in line 001) for selected products. The normal prices are retrieved from the "item_list" table (line 003-004 of Table I) as described above with reference to Table I. More specifically, if a given customer is a senior citizen, i.e., older than 65 years (line 007 of Table II), then the discount price amounts to 85% of the normal price (line 008 of Table II). If the given customer is a child, i.e., younger than 12 years (line 009 of Table II), then the discount price amounts to 50% of the normal price (line 010 of Table II). Otherwise, the normal price is returned without modification (lines 011-012 of Table II).

More generally, the exemplary UDF of Table II includes a first conditional statement (line 007 of Table II) configured to identify senior citizens and a second conditional statement (line 009 of Table II) configured to identify children. The first conditional statement is associated with a first set of instructions (line 008 of Table II) for calculating discount prices for senior citizens that is executed on data records related to data that satisfies the first conditional statement. The second conditional statement is associated with a second set of instructions (line 010 of Table II) for calculating discount prices for children that is executed with respect to data records related to data that satisfies the second conditional statement.

By way of example, assume now that the data partition 220 includes only data related to senior citizens, i.e., individuals that are older than 65 years. Accordingly, only the first conditional statement in line 007 of the exemplary UDF of Table II is satisfied by data included with the partition 220. Thus, only the first set of instructions in line 008 of the exemplary UDF of Table II is applicable to result data related to the data in the partition 220. Accordingly, in one embodiment a modified UDF 224 is created on the basis of the first set of instructions and stored in the partition 220. In one embodiment, the modified UDF 224 is executed on each data record retrieved for each query referencing the conditional UDF 129, such as the query 210, that refers to the data in the partition 220. An illustrative UDF "ADJ_PRICE" exemplifying the modified UDF 224 is shown in Table III below. By way of illustration, the illustrative modified UDF is defined using SQL. However, any other language may be used to advantage and is, thus, broadly contemplated.

TABLE III

MODIFIED ADJ PRICE UDF EXAMPLE

| 001 | CREATE FUNCTION ADJ_PRICE(cust_id INT, price DOUBLE) |
|---|---|
| 002 | RETURNS DOUBLE |
| 003 | LANGUAGE SQL |
| 004 | BEGIN |
| 005 | RETURN price * 0.85; |
| 006 | END; |

As can be seen from Table III, the exemplary modified UDF is only configured to calculate the discount prices for senior citizens (line 005) according to line 008 of Table II.

Assume further that the data partition 230 includes only data related to adults that are older than 18 years and younger than 65 years. Accordingly, neither the first conditional statement in line 007 of the exemplary UDF of Table II nor the second conditional statement in line 009 of the exemplary UDF of Table II is satisfied by data in the partition 230. Accordingly, no discount prices are calculated for individuals that are referred to by result data related to data in the data partition 230. In other words, only the instruction in line 012 of the exemplary UDF of Table II that returns the normal price is applicable to the result data related to the data in the data partition 230. Accordingly, in one embodiment a modified UDF 234 is created on the basis of this instruction and stored in the partition 230. The modified UDF 234 is executed on each data record retrieved for each query associated with the conditional UDF 129, such as the query 210, that refers to the data in the partition 230. An illustrative UDF "ADJ_PRICE" exemplifying the modified UDF 234 is shown in Table IV below. By way of illustration, the illustrative modified UDF is defined using SQL. However, any other language may be used to advantage and is, thus, broadly contemplated.

TABLE IV

MODIFIED ADJ PRICE UDF EXAMPLE

| 001 | CREATE FUNCTION ADJ_PRICE(cust_id INT, price DOUBLE) |
| 002 | RETURNS DOUBLE |
| 003 | LANGUAGE SQL |
| 004 | BEGIN |
| 005 |     RETURN price; |
| 006 | END; |

As can be seen from Table IV, the exemplary modified UDF is only configured to return the normal prices (line 005) according to line 012 of Table II.

However, it should be noted that the exemplary modified UDF of Table IV does not perform any operation on entered prices ("price" in line 001 of Table IV) as the normal price is simply returned (line 005 of Table IV). Accordingly, in one embodiment execution of the conditional UDF 129 on result data related to data in the data partition 230 can be disabled. To this end, a corresponding no-operation flag "NO-OP" can be set in the partition 230 in one embodiment. In other words, for result data related to data included with the data partition 220, the conditional UDF 129 is ignored, i.e., no operation defined by the conditional UDF 129 is performed on corresponding data records. All such different implementations are broadly contemplated.

Assume finally that the data partition 240 includes data related to individuals of various different age groups. Accordingly, the first conditional statement in line 007 of the exemplary UDF of Table II, the second conditional statement in line 009 of the exemplary UDF of Table II, or none of both can be satisfied by the data in the data partition 240. Thus, any one of the instructions defined by the conditional UDF 129 can potentially be executed on result data related to data included with the partition 240. Accordingly, in one embodiment a UDF 244 that corresponds to the conditional UDF 129 is created and stored in the partition 240. In other words, the conditional UDF 129 is copied and the copy is stored as the UDF 244 in the data partition 240.

It should be noted that the above merely describes an exemplary setup of the partitioned database 127 used to illustrate one implementation of the invention. However, other implementations with respect to more or less complex conditional UDFs are also possible. For instance, a particular data partition may only include data related to children that are younger than 12 years. Accordingly, a modified UDF configured to execute only the instruction of line 010 of the exemplary UDF of Table II can be created as described above with respect to Table III and stored in this particular partition. Furthermore, in one embodiment a corresponding UDF includes multiple conditional statements, subsets of which are associated with different groups of instructions. Accordingly, the UDF 129 and multiple different modified UDFs can be stored on multiple distinct data partitions. In another embodiment, the UDF 129 includes a single conditional statement associated with a single instruction. In this case, the UDF 129 can be stored on one or more data partitions, while one or more other partitions can be disabled for execution of the UDF 129. Accordingly, all such different implementations are broadly contemplated.

Further, it will be appreciated that the examples described above are merely illustrative and not limiting. For example, the condition on which a discount is given can be other than an age range. Thus, in another embodiment, a UDF may be configured on the basis of whether an individual bought more than a threshold quantity of goods, placed more than a threshold number of orders or spent more than a threshold amount of money. Any other variety of UDFs may be implemented.

In one embodiment, the above described setup of the partitioned database 127 with respect to the conditional UDF 129 is performed by an administrator of the partitioned database 127. An exemplary method for managing setup of a partitioned database having a plurality of data partitions for use with one or more UDFs is described below with reference to FIG. 3.

Managing Setup of a Partitioned Database

Figure 3:
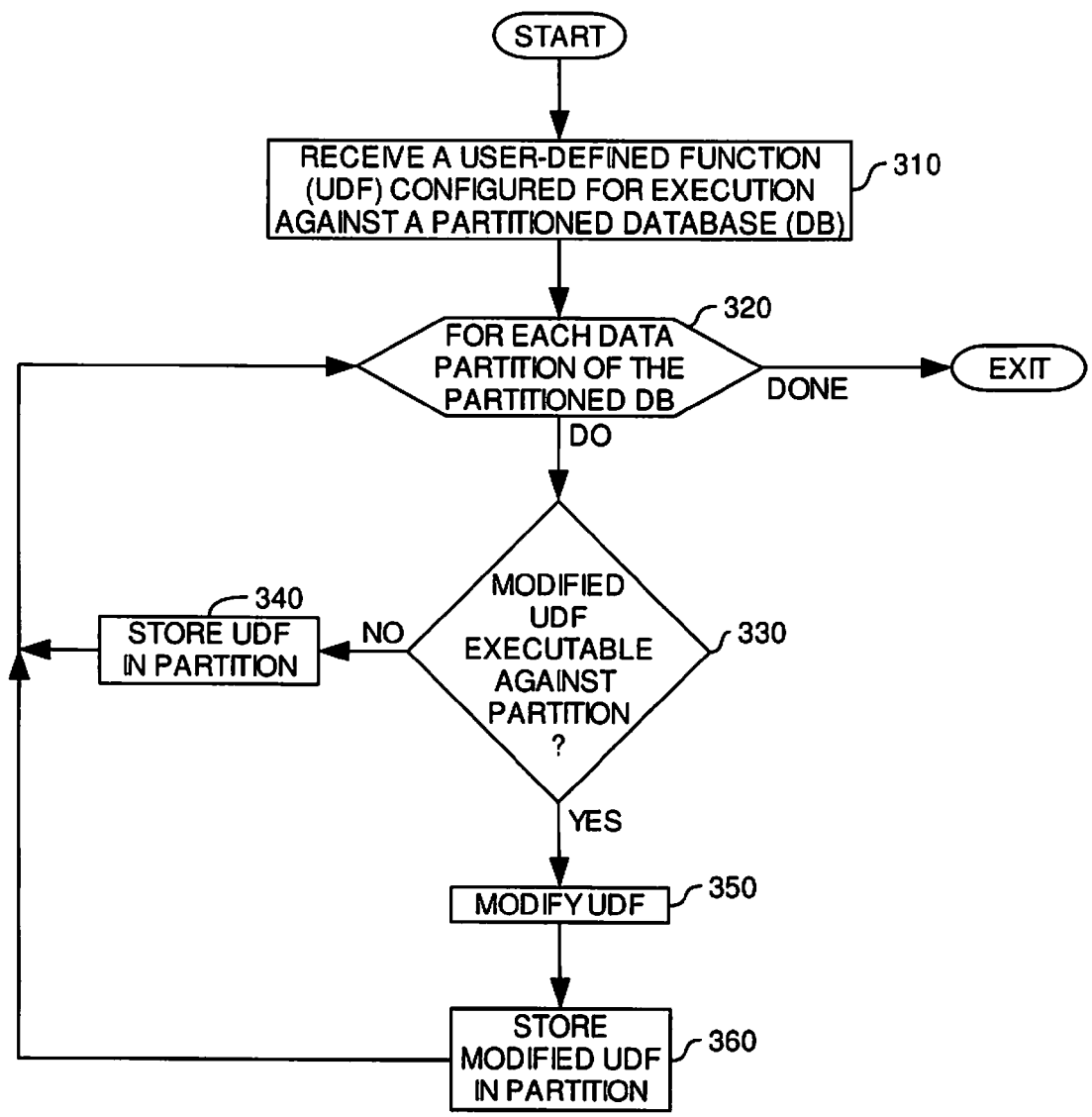
FIG. 3 is a flow chart illustrating a method of managing setup of a partitioned database for operation of a user-defined function according to one embodiment of the invention.

Referring now to FIG. 3, one embodiment of a method 300 for configuring a partitioned database (e.g., partitioned database 127 of FIG. 2) having a plurality of data partitions (e.g., data partitions 220, 230, 240 of FIG. 2) for use with one or more conditional UDFs (e.g., UDF 129 of FIG. 2) is described. In one embodiment, at least a portion of the steps of method 300 is performed by an administrator of the partitioned database.

Method 300 starts at step 310, where a conditional UDF having one or more conditional statements and corresponding associated instructions configured for execution against the partitioned database is received. In one embodiment, the conditional UDF is received by the administrator of the partitioned database for configuration of the database. According to one aspect, receiving the UDF includes creating the UDF or retrieving the UDF from memory (e.g., memory 122 of FIG. 1). Assume that in the given example the exemplary UDF of Table II above is received, which is configured for execution against the partitioned database 127 of FIG. 2, as described above.

At step 320, a loop consisting of steps 320 to 360 is performed for each data partition of the partitioned database. Assume now that in the given example the database administrator initially enters the loop for the data partition 220 of FIG. 2.

At step 330, the database administrator determines whether only a portion of the received UDF is applicable with respect to data included with the data partition. If so, processing proceeds with step 350 where a modified UDF is created on the basis of the received UDF. At step 360, the created modified UDF is stored in the data partition. Otherwise, processing proceeds with step 340 where the received UDF, i.e., a complete copy thereof, is stored in the data partition.

In the given example, it is determined at step 330 that only the portion of the exemplary UDF of Table II that refers to senior citizens (lines 007-008 of Table II) is applicable to the data partition 220, as noted above. Accordingly, at step 350 the exemplary modified UDF of Table III is created. The exemplary modified UDF of Table III is then stored in the data partition 220 as the modified UDF 224 at step 360.

Processing then returns to step 320, where the loop consisting of steps 320 to 360 is entered for a next data partition of the partitioned database. Assume now that in the given example the loop is next entered for the data partition 230 of FIG. 2. Accordingly, it is determined at step 330 that only the portion of the exemplary UDF of Table II that refers to individuals that are neither senior citizens nor children (lines 011-012 of Table II) is applicable with respect to data included with the data partition 230. Accordingly, at step 350 the exemplary modified UDF of Table IV is created. Then, at step 360 the exemplary modified UDF of Table IV is stored in the data partition 230 as the modified UDF 234.

Processing then returns to step 320 again, where the loop consisting of steps 320 to 360 is entered for a next data partition of the partitioned database. Assume now that the loop is performed in the given example for all data partitions of the partitioned database 127 of FIG. 2 and that the loop is finally entered for the data partition 240 of FIG. 2. Accordingly, it is determined at step 330 that no separate portion of the exemplary UDF of Table II is applicable with respect to data included with the data partition 240. Accordingly, at step 340 the exemplary UDF of Table II is copied and the copy is stored in the data partition 240 as the UDF 244.

When the loop consisting of steps 320 to 360 was performed for each data partition of the partitioned database, method 300 exits. In other words, in the given example the database administrator terminates the setup process as configuration of the partitioned database 127 of FIG. 2 for use with the conditional UDF 129 of FIG. 2 was completed.

As was noted above, the method 300 is performed in one embodiment by the administrator of the partitioned database. Alternatively, the setup process according to method 300 can be performed using a suitable software program. For instance, in one embodiment the query execution component 124 of FIG. 1 is configured for managing the setup process. Such a suitable software program can be configured to operate in a discovery mode in which the program identifies which portion(s) of the UDF 129 is applicable to which of the data partitions 220, 230, 240 by examining the data contained in the respective partitions. On the basis of results determined in the discovery mode, the modified UDFs 224, 234 can be created and stored in corresponding identified data partitions, such as the partitions 220, 230, as described above. Furthermore, the setup process performed by the database administrator can be supported by the suitable software program. For instance, the software program can indicate to the administrator which conditional statement of the UDF is satisfied on which data partition. The administrator can then implement the appropriate modified UDF on the respective partition(s). Moreover, suitable database triggers (e.g., database triggers 139 of FIG. 1) can be used to monitor changes to the partitioned database. For instance, in the given example a given trigger can be configured to alert the database administrator when a user stores data related to an individual that is younger than 65 years in the data partition 220 of FIG. 2. Thus, the database administrator can invalidate the UDF setup of the data partition 220 and/or the partitioned database 127 and perform a new setup according to the method 300. Alternatively, the trigger may cause an automated adjustment to the UDF on the basis of detecting a change to the data. All such implementations are broadly contemplated.

Managing Execution of a Query that References a UDF

Figure 4:
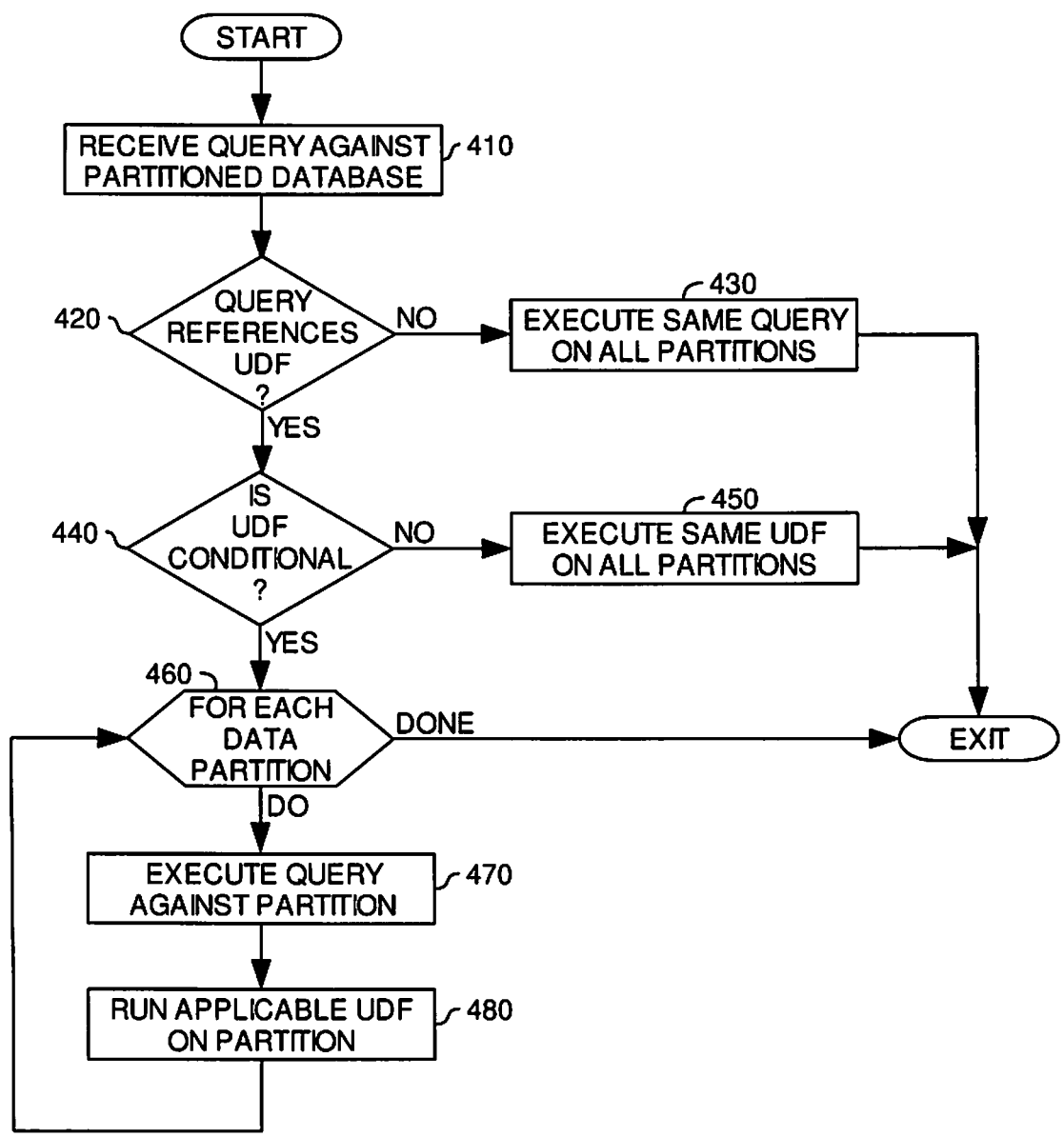
FIG. 4 is a flow chart illustrating a method of managing execution of a query referencing a user-defined function against a partitioned database according to one embodiment of the invention.

Referring now to FIG. 4, one embodiment of a method 400 for executing a query (e.g., query 210 of FIG. 2) that references a UDF (e.g., UDF 129 of FIG. 2) against a partitioned database (e.g., partitioned database 127 of FIG. 2) having a plurality of data partitions (e.g., data partitions 220, 230, 240 of FIG. 2) is described. In one embodiment, at least a portion of the steps of method 400 is performed by the query execution component 124 of FIG. 2.

Method 400 starts at step 410, where a query against an underlying database is received. Assume now that in the given example the exemplary query of Table I above is received.

At step 420, it is determined whether the received query references a UDF. If so, processing proceeds with step 440. Otherwise, the received query is executed at step 430 against each data partition of the underlying database to determine a query result for the executed query and processing exits. However, in the given example the exemplary query of Table I references the exemplary UDF of Table II above so that processing proceeds with step 440.

At step 440, it is determined whether the referenced UDF is a conditional UDF applied to a partitioned database having one or more data partitions. If so, processing proceeds with step 460. Otherwise, the received query is executed at step 450 to determine the query result. Then, the referenced UDF is executed on each data partition of the partitioned database with respect to the query result and processing exits. However, as noted above, in the given example of the exemplary UDF of Table II processing proceeds with step 460.

At step 460, a loop consisting of steps 460 to 480 is entered for each data partition of the partitioned database. When the loop was performed for each data partition, processing exits. Assume that in the given example the loop consisting of steps 460 to 480 is initially entered for the data partition 220 of FIG. 2.

At step 470, the received query is executed against the data partition to identify one or more data records returned for the query on which the referenced UDF should be executed. Assume that in the given example a data record indicating a normal price of $25 for a selected product is identified for a given customer who is uniquely identified by an associated customer identifier ("cust_id" in line 002 of Table I). Assume further that the given customer is 70 years old and that the customer identifier refers to the data partition 220 of FIG. 2.

At step 480, the applicable UDF is determined from the data partition and executed on the identified data record(s). In the given example, the exemplary modified UDF of Table III is performed on the price of $25 to calculate a discount price for the given customer. According to line 005 of the exemplary modified UDF of Table III, the discount price is the normal price multiplied with a factor of 0.85, i.e., in the given example $25*0.85=$21.25. Accordingly, the calculated discount price is returned as result with respect to the data partition 220 of FIG. 2 and processing returns to step 460, where the loop consisting of steps 460 to 480 is performed for a next data partition.

While the foregoing is directed to embodiments of the present invention, other and further embodiments of the invention may be devised without departing from the basic scope thereof, and the scope thereof is determined by the claims that follow.

What is claimed is:

1. A computer-implemented method for managing execution of a query against a partitioned database having a plurality of data partitions, comprising:
 providing a user-defined function comprising a plurality of conditional statements each being associated with one or more instructions defining operations to be performed on data returned in response to execution of the query;
 for each of the plurality of data partitions:
 examining data of the data partition; and
 on the basis of examined data, implementing (i) a copy of the user-defined function on the data partition when data exists in the respective data partition for all of the plurality of conditional statements and (ii) a modified form of the user-defined function on the data partition when data exists in the respective data partition for only a subset of the plurality of conditional statements, wherein the modified form of the user-defined function contains only the subset of the plurality of conditional statements for which data exists in the respective data partition; and executing, by operation of one or more computer processors, the query referring to the user-defined function against the plurality of data partitions; wherein execution of the query on each data partition invokes execution of the respective user-defined function against the data returned in response to execution of the query against the respective data partition.

2. The method of claim 1, wherein each modified form of the user-defined function is configured to avoid running unnecessary code fragments returning meaningless data for the query executed against the respective data partition.

3. The method of claim 1, wherein each modified form of the user-defined function is persistently stored in the respective data partition.

4. The method of claim 1, wherein at least one modified form of the user-defined function contains instructions associated with one of the plurality of conditional statements.

5. The method of claim 1, wherein implementing a modified form of the user-defined function on the data partition comprises disabling execution of the user-defined function on the data partition.

6. A computer-implemented method for managing execution of a query against a partitioned database having a plurality of data partitions, comprising:

receiving a query for execution against each of the plurality of data partitions, the query referencing a user-defined function comprising a plurality of conditional statements each being associated with one or more instructions defining operations to be performed on data returned in response to execution of the query; and wherein at least some of the plurality of data partitions are associated with different modified forms of the user-defined function, and each of the modified forms of the user-defined function containing a subset of the plurality of conditional statements, the subset being only those of the plurality of conditional statements for which data exists in the respective data partition;

executing, by operation of one or more computer processors, the query against each of the plurality of data partitions; and for each execution of the query, returning a respective result set from each of the plurality of data partitions; and invoking the respective associated modified form of the user-defined function to execute on the respective result set returned from the respective data partition with which the user-defined function is associated, thereby producing a modified result set for each data partition.

7. The method of claim 6, wherein at least one modified form of the user-defined function contains instructions associated with one of the plurality of conditional statements.

8. The method of claim 6, wherein each subset of the plurality of conditional statements is selected according to the data contained in the respective data partition.

9. The method of claim 8, wherein each of the plurality of conditional statements is associated with one or more instructions, each defining an operation to be performed on data returned in response to execution of the query; and each modified form of the user-defined function contains corresponding instructions associated with the subset of the plurality of conditional statements.

10. The method of claim 6, wherein execution of the user-defined function is disabled on at least one data partition; and invoking the respective associated user-defined function on the at least one data partition comprises:

determining that execution of the user-defined function is disabled on the at least one partition; and executing the query against the at least one partition without executing the user-defined function on the at least one data partition.

11. A non-transitory computer-readable storage medium containing a program which, when executed by a computer processor, performs an operation for managing execution of a query against a partitioned database having a plurality of data partitions, the operation comprising:

providing a user-defined function comprising a plurality of conditional statements each being associated with one or more instructions defining operations to be performed on data returned in response to execution of the query;

for each of the plurality of data partitions:

examining data of the data partition; and on the basis of examined data, implementing (i) a copy of the user-defined function on the data partition when data exists in the respective data partition for all of the plurality of conditional statements and (ii) a modified form of the user-defined function on the data partition when data exists in the respective data partition for only a subset of the plurality of conditional statements, wherein the modified form of the user-defined function contains only the subset of the plurality of conditional statements for which data exists in the respective data partition; and executing, by operation of one or more computer processors, the query referring to the user-defined function against the plurality of data partitions; wherein execution of the query on each data partition invokes execution of the respective user-defined function against the data returned in response to execution of the query against the respective data partition.

12. The computer-readable storage medium of claim 11, wherein each modified form of the user-defined function is configured to avoid running unnecessary code fragments returning meaningless data for the query executed against the respective data partition.

13. The computer-readable storage medium of claim 11, wherein each modified form of the user-defined function is persistently stored in the respective data partition.

14. The computer-readable storage medium of claim 11, wherein at least one modified form of the user-defined function contains instructions associated with one of the plurality of conditional statements.

15. The computer-readable storage medium of claim 11, wherein implementing a modified form of the user-defined function on the data partition comprises disabling execution of the user-defined function on the data partition.

* * * * *